(12) United States Patent
Hanna (10) Patent No.: US 12,204,983 B2
(45) Date of Patent: *Jan. 21, 2025

(54) ASSET MOVEMENT AND LOCALIZATION SYSTEM AND METHOD OF USE

(71) Applicant: Molocar, Inc., Irving, TX (US)

(72) Inventor: Michael S. Hanna, Colleyville, TX (US)

(73) Assignee: Molocar, Inc., Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,605

(22) Filed: Oct. 2, 2023

(65) Prior Publication Data

US 2024/0028849 A1 Jan. 25, 2024

Related U.S. Application Data

(63) Continuation of application No. 17/236,419, filed on Apr. 21, 2021, now Pat. No. 11,829,833, which is a continuation-in-part of application No. 15/178,910, filed on Jun. 10, 2016, now Pat. No. 11,019,471.

(60) Provisional application No. 62/174,034, filed on Jun. 11, 2015.

(51) Int. Cl.
| | | |
|---|---|---|
| *G06F 16/29* | (2019.01) | |
| *G06K 7/10* | (2006.01) | |
| *G06K 19/07* | (2006.01) | |
| *H04W 64/00* | (2009.01) | |

(52) U.S. Cl.
CPC ........... *G06K 7/1091* (2013.01); *G06F 16/29* (2019.01); *G06K 19/0724* (2013.01); *H04W 64/003* (2013.01)

(58) Field of Classification Search
CPC . G06Q 10/0833; H04L 67/2842; H04L 63/08; H04L 67/02; H04L 67/32; H04W 4/02; H04W 64/00; H04W 24/00; H04W 4/021; H04W 4/028; H04W 4/04; H04W 4/008; H04W 64/003; H04W 84/12; G01S 11/02; G01S 11/12; G01S 13/04; G08B 13/1427; G08B 13/2462; G06K 2017/0045

See application file for complete search history.

(56) References Cited

U.S. PATENT DOCUMENTS

| | | | |
|---|---|---|---|
| 9,462,357 B2 | 10/2016 | Westick | |
| 11,829,833 B1 * | 11/2023 | Hanna | ..................... G06F 16/29 |
| 2007/0252696 A1 | 11/2007 | Belisle | |
| 2008/0074265 A1 * | 3/2008 | Schoen | ............. G08B 13/1427 340/572.1 |
| 2008/0231446 A1 * | 9/2008 | Cresto | .................. G06Q 10/087 340/572.1 |
| 2009/0098907 A1 | 4/2009 | Huntzicker | |
| 2011/0172887 A1 | 7/2011 | Reeve | |
| 2013/0151558 A1 | 6/2013 | Chercoles Sanchez | |
| 2014/0286326 A1 | 9/2014 | Jang | |
| 2014/0344895 A1 | 11/2014 | Jimenez Arreola | |
| 2015/0230100 A1 | 8/2015 | Atia | |
| 2015/0346313 A1 | 12/2015 | Smith | |

(Continued)

*Primary Examiner* — Fred A Casca (57) ABSTRACT

An asset movement and localization system deploys gateways to communicate with transmitters that are attached to an asset. The transmitters communicate with the system to provide the location of the asset. The system uses the location to determine if the asset is in the proper or desired location for a process or for presentation.

20 Claims, 8 Drawing Sheets

(56) References Cited

U.S. PATENT DOCUMENTS

2016/0227359 A1 8/2016 Hurewitz
2020/0143332 A1 5/2020 Root

* cited by examiner

ASSET MOVEMENT AND LOCALIZATION SYSTEM AND METHOD OF USE

CROSS-REFERENCE TO RELATED APPLICATIONS

This application is a continuation claiming the benefit of priority under 35 U.S.C. § 120 based on U.S. patent application Ser. No. 17/236,419 (now patented as U.S. Pat. No. 11,829,833) which was filed on Apr. 21, 2021, which claims the benefit of priority under 35 U.S.C. § 120 based on U.S. patent application Ser. No. 15/178,910 (now patented as U.S. Pat. No. 11,019,471) which was filed on Jun. 10, 2016, which itself claimed the benefit of priority under 35 USC 119 (e) based on U.S. Provisional Patent Application No. 62/174,034 filed on Jun. 11, 2015. The contents of each of these aforementioned applications are incorporated herein by reference in their entirety.

BACKGROUND

1. Field of the Invention

The present invention relates generally to asset location systems and more specifically to interactive asset movement and localization systems for car dealerships.

2. Description of Related Art

Figure 1:
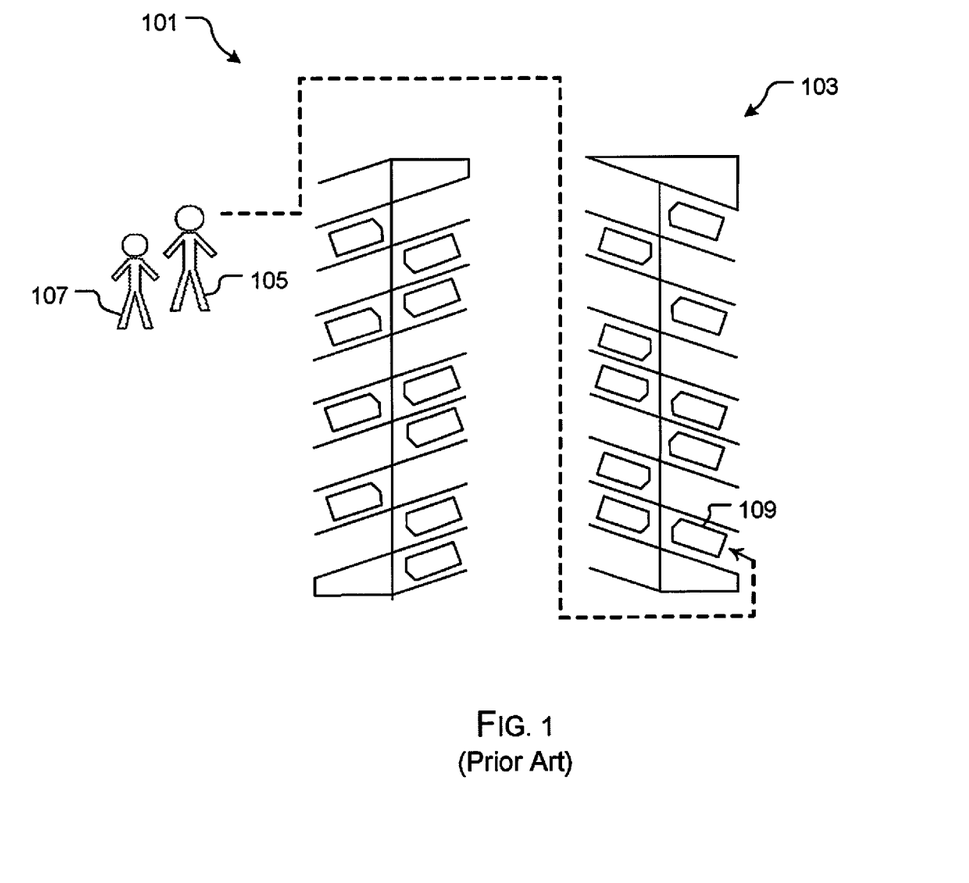
FIG. 1 is a top view of an asset location system at a conventional dealership.

Systems for locating one or more assets are well known in the art. For example, FIG. 1 depicts a conventional dealership system 101 wherein a salesman 105 assists a customer 107 in locating a vehicle 109 within a parking lot 103.

Problems commonly associated with system 101 include inefficient and time consuming efforts in physically searching for vehicle 109. Further, these problems are prone to increase with human error, poor asset management, or large lot sizes.

Although great strides have been made in the area of asset location and management systems for car dealerships, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional asset location and management systems. Specifically, the system and method of use of the present application provide efficient, automated means to locate and manage assets across a large area and with minimal risk of human error. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
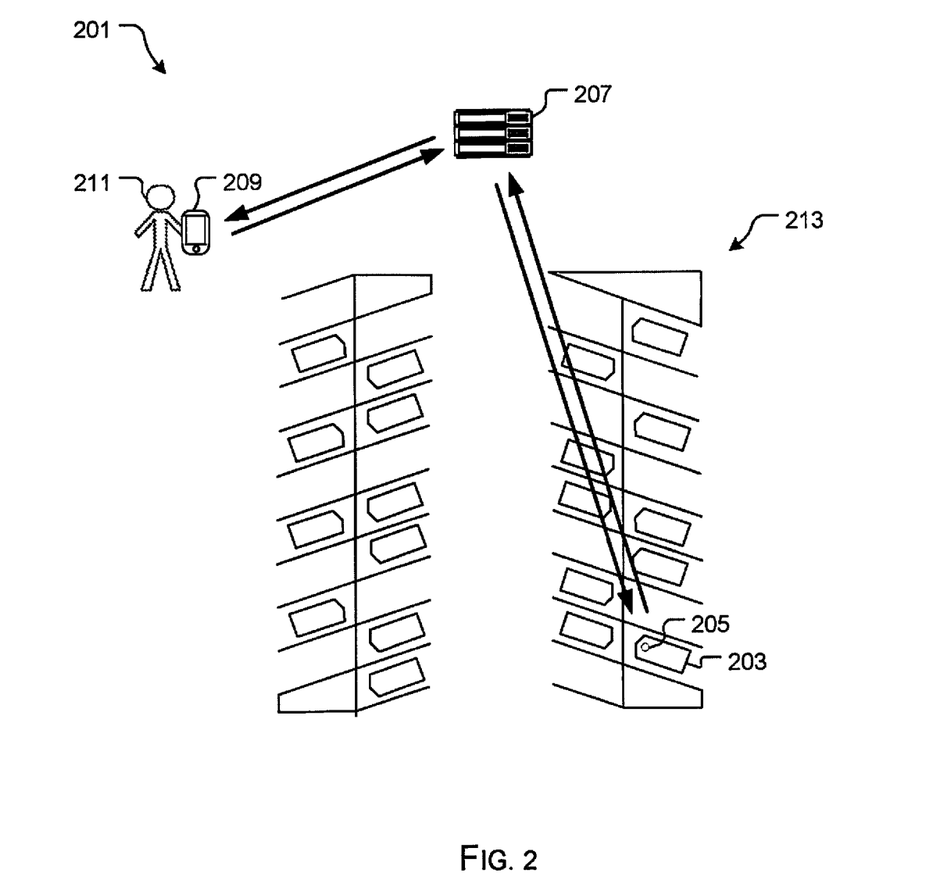
FIG. 2 is a top view of an interactive asset location and management system in accordance with a preferred embodiment of the present application.

Referring now to the drawings wherein like reference characters identify corresponding or similar elements throughout the several views, FIG. 2 depicts a top view of an interactive asset location and management system 201 in accordance with a preferred embodiment of the present application. System 201 comprises an asset 203 paired to a transmitter 205 in wireless communication with a database 207 that is also in wireless communication with a querying device 209 such as a cellphone, it should be understood the querying the device could be any other computing device that is capable of sending and receiving data.

It is contemplated and will be appreciated that transmitter 205 can be made highly cost effective by using a low energy beacon such as Bluetooth that does not rely on geo-positioning or cellular technology and can be paired to asset 203 via transmitted IDs. It will be further appreciated a user 211 can use querying device 209 to search for asset 203 via parameters such as stock number, asset ID, VIN#, or location within a parking lot 213. And that the asset can be paired to the transmitter 205.

Figure 3:
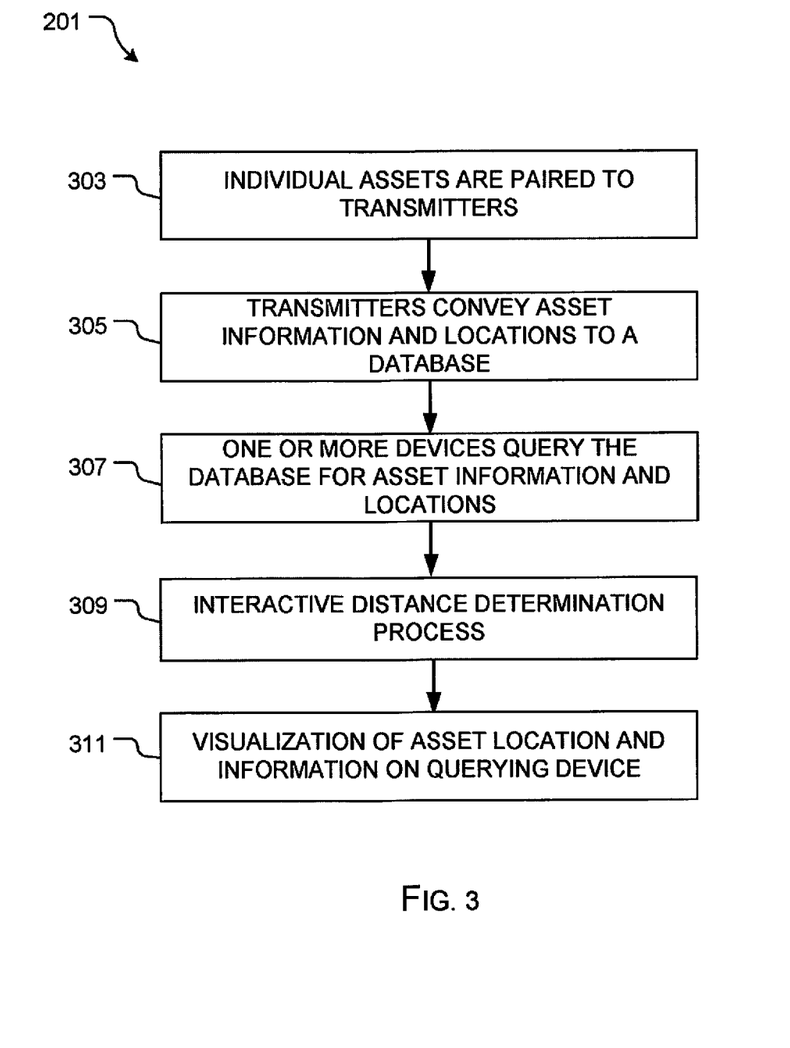
FIG. 3 is a flowchart defining the process of FIG. 2.

Referring now to FIG. 3, a flowchart defining the process of FIG. 2 is shown. As described above system 201 comprises the following steps: individual assets paired to transmitters 303, said transmitters conveying asset information and locations to a database 305, one or more devices querying the database for asset information and locations 307, an interactive distance determination process 309, and the visualization of asset location and information on the querying device 311. Where the transmitters provide a signal that allows the database to retrieve information related to the asset.

One of the unique features believed characteristic of the present application is that system 201 implements an interactive distance determination process and visualization software as demonstrated by steps 309 and 311 of FIG. 3, respectively.

Figure 4:
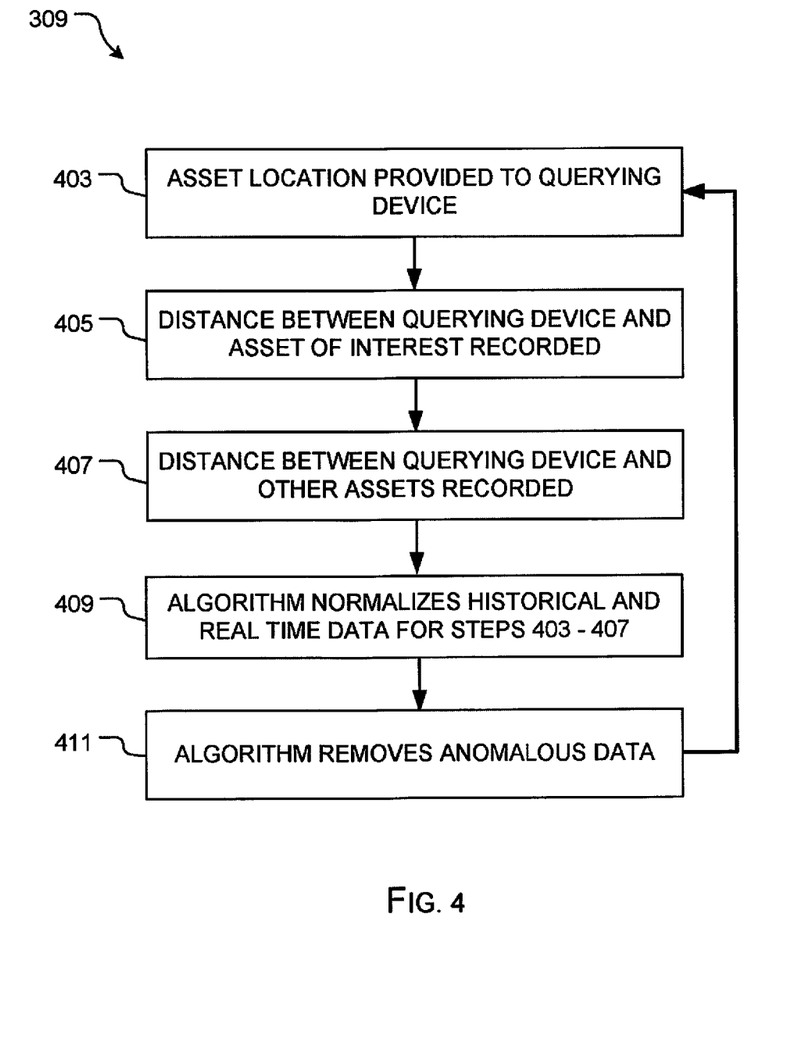
FIG. 4 is a flowchart defining the interactive distance determination subprocess of FIG. 3.

Referring now to FIG. 4 the interactive distance determination process of step 309 is shown. Here, step 309 incorporates a self-improving algorithm that provides asset location information 403 and distance 405 to a querying device (not shown). To increase the precision of asset location information 403 the algorithm also measures the distance of the querying device from other asset locations 407, normalizes all historical location data with real-time updates 409, and removes any anomalous data 411.

An alternative embodiment significantly enhances the interactive distance determination process of step 309 by also incorporating stationary transmitters that identify fixed location information to a querying device. For example, stationary transmitters will allow the self-improving algorithm to determine on which floor an asset is located within a parking garage.

It is contemplated that steps 309 and 311 can be used to show asset 203 in a spreadsheet, on a map, by received signal strength indication (RSSI), or by any other useful form of presentation.

It is also contemplated that transmitter 205 can include sensors such as accelerometers or thermometers (not shown) that inform the database 207 and user 211 of important status changes such as asset 203 relocation or harmful interior temperatures that could result in higher maintenance costs. It will be appreciated that this functionality can be paired with software to automatically assign and track employee tasks. For example, software can associate changes to an asset's location with the querying device nearest the asset at that time to determine who would have moved the asset and to automatically task that individual with returning the asset.

An alternative embodiment for system 201 contemplates integrating steps 309 and 311 with sales data and time stamps to optimize where each asset 203 should be located within parking lot 213 to maximize sales. Another alternative embodiment contemplates integrating steps 309 and 311 with a customer relationship management platform (CRM) that can, for example, interact with the social media content of potential customers to pre-identify each customer's vehicle preferences, assign employee tasks, or alert asset owners to consumer trends. It will be appreciated that these alternative embodiments will enhance the sales experience, particularly if the respective querying devices of the employee and customer recognize proximity to each other and correlate customer preferences with inventory.

Figure 5:
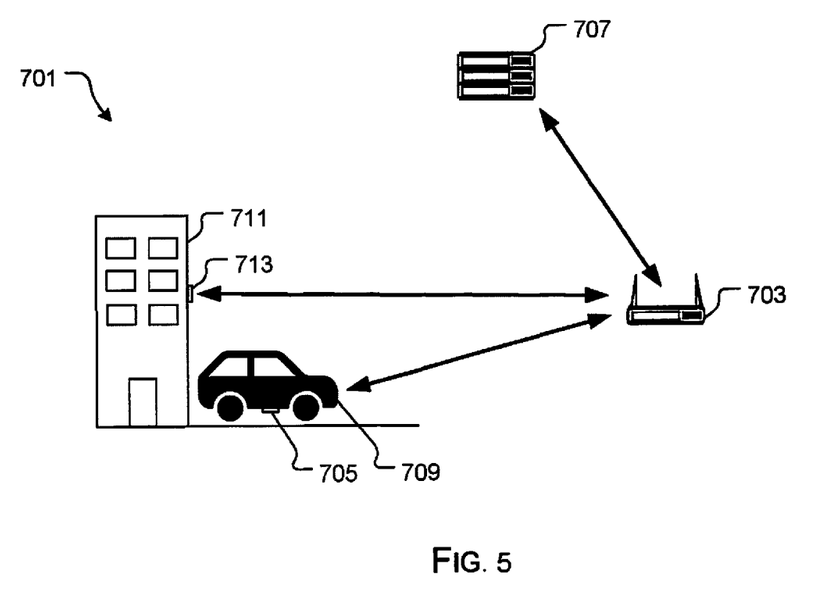
FIG. 5 is a side view of an alternative embodiment of the system of FIG. 2.

Referring now to FIG. 5 an alternate embodiment of the system 201 is depicted. Embodiment 701 includes a gateway 703 that is in wireless communication with asset transmitters 705 and a database 707. The gateway 703 receives electromagnetic waves that allow for communication with the transmitters 705. Additionally, a stationary transmitter 713 is attached to building 711 and is configured to provide the gateway 703 with information about the building 711. The gateway 703 determines the proximity of the asset transmitters 705 to the stationary transmitter 713 and thereby the distance of the asset 709 to the building 711.

It is contemplated that the transmitters 705 communicate the location of the asset such as an automobile 709 while it is subject to a set of tasks that are required to affect the asset. These tasks are grouped in a workflow to effectuate value added work to the asset.

Figure 6:
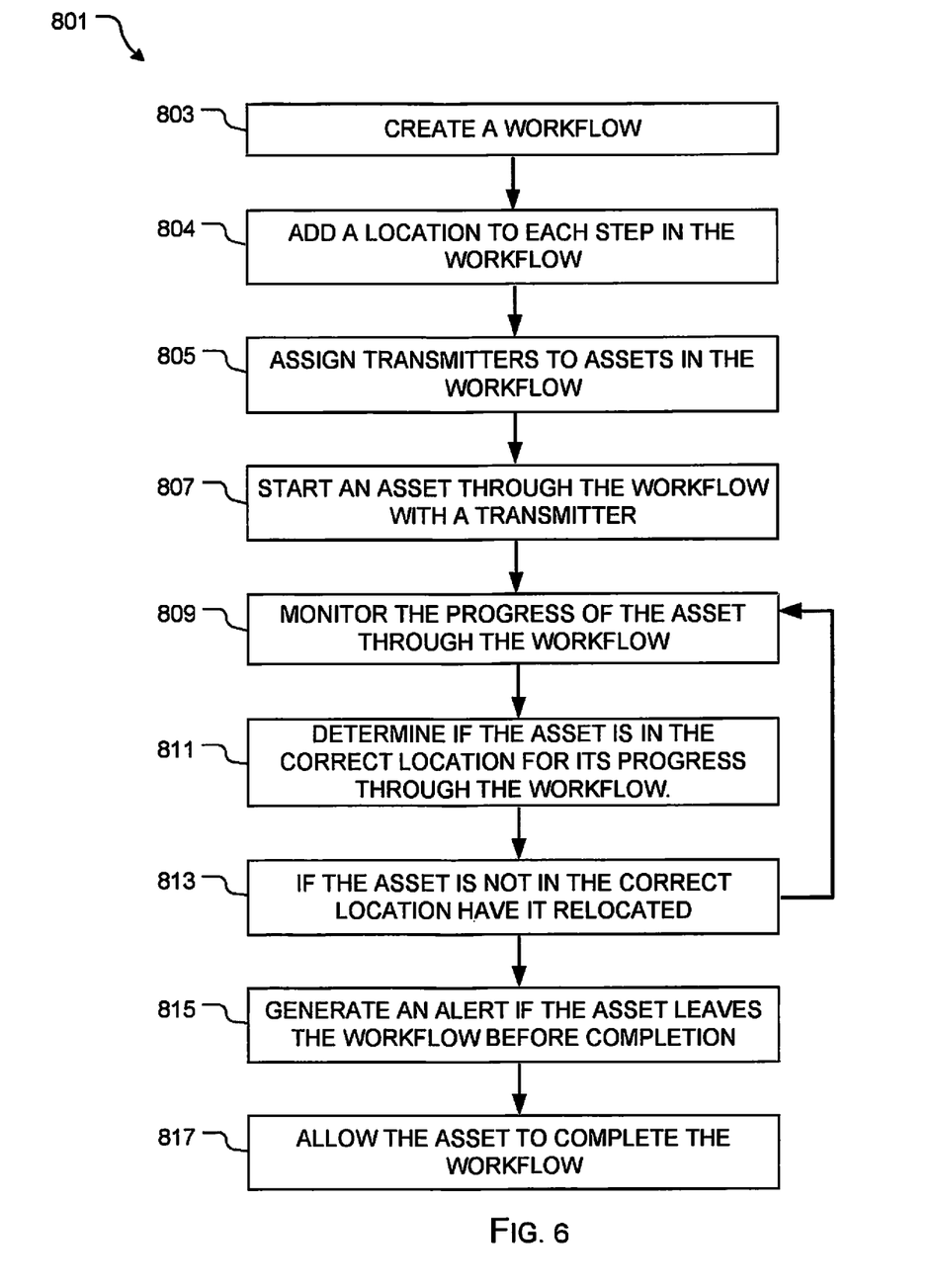
FIG. 6 is a flow chart of an alternative process of FIG. 3.

Referring to FIG. 6, the process includes creating a workflow 803, such as preparing an automobile for sale, adding locations for each step in the workflow 804, assigning transmitters to the assets that will follow the workflow 805, starting an asset in the workflow 807, monitoring the progress of the asset through the workflow 809, determining if the asset is in the correct location for its progress through the workflow 811, if the asset is not in the correct location relocating it 813 and monitoring its progress in the workflow, generating an alert if the asset leaves the workflow before completion 815, and allowing the asset to complete the workflow 817.

The gateway 703 also collects other data related to the communication with the asset transmitters 705 such as the time of each communication, gateway ID that had the communication, other assets that the gateway communicated with, and the like. This data is used by the database to determine the time duration an asset is in one location, time of location change and the like. With respect to the workflow the asset transmitter 705 enables the determination if the asset is in the correct location for the current task in the workflow and other such relationships between the assets and the workflow. Also, the system through communication with the assets determines if the location of an asset indicates that the asset is either malfunctioning, stolen or otherwise outside the scope of its use or location. The system could generate an alert that the asset is outside its boundaries or its workflow.

Figure 7:
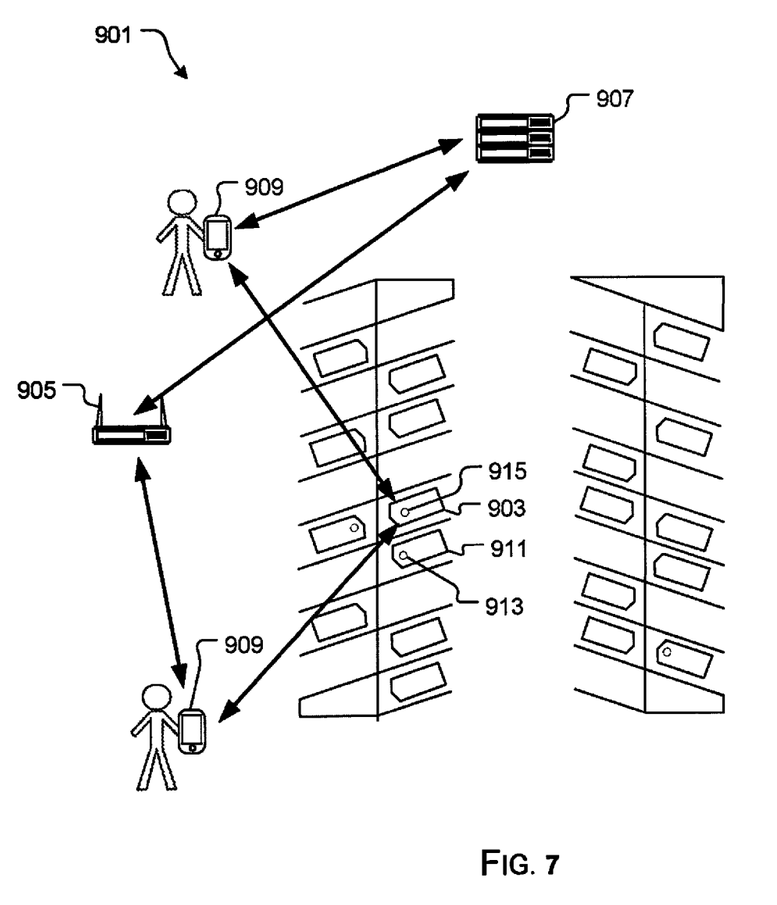
FIG. 7 is a top view of an alternative embodiment of the system of FIG. 2.

Referring now to FIG. 7 an alternative use of the system 201 is depicted where a first asset 903 is not found by communication with the gateway 905. In embodiment 901 when database 907 determines that first asset 903 has not communicated with the system for a time period a command is sent to the transmitters 915 and 913 on the system 901 so that each transmitter attempts to communicate with the gateways 905, this request to communicate is received by all of the transmitters within range thereof, including the transmitter 915 of the first asset 903 and a second transmitter 913 of a second asset 911. This command allows for all transmitters to be located and identified. It will be understood that a wake-up device is included with each transmitter and detects the command to communicate from the querying devices 909. If the asset 903 is not located in this way and is not in communication with any of the gateways 905 they system notes that the asset has left the physical area thereof.

Figure 8:
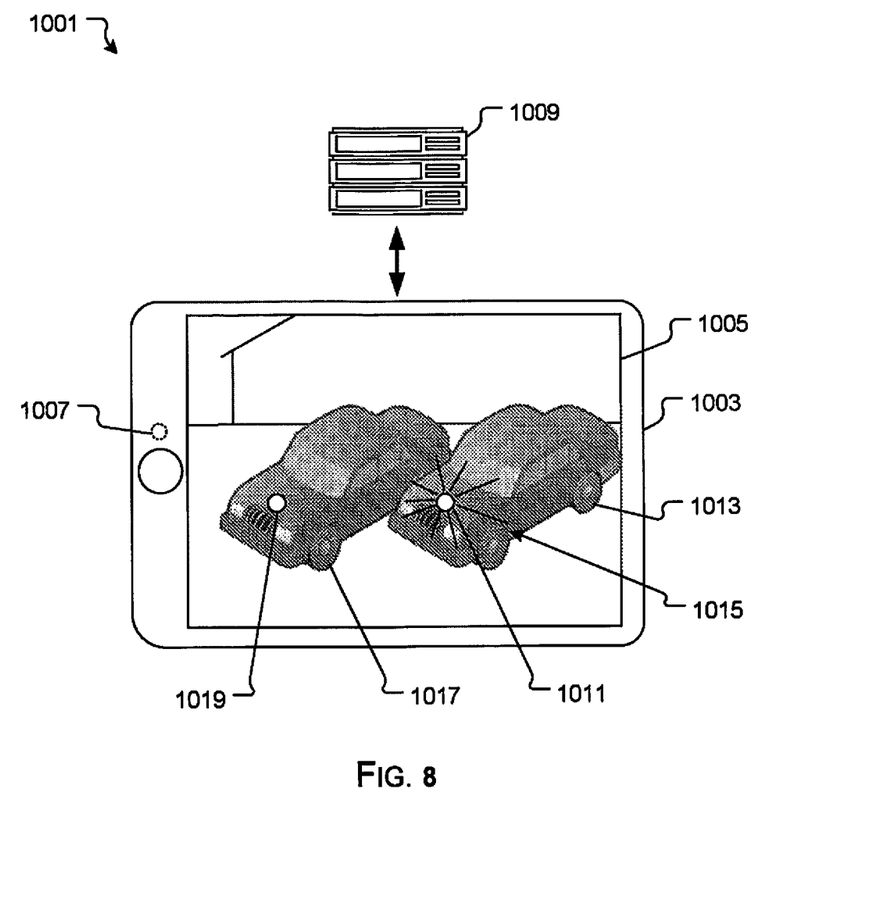
FIG. 8 is a front view of an alternative embodiment of the system of FIG. 2 in use.

It is contemplated that the database could provide a visual display to the querying devices as depicted by FIG. 8. Embodiment 1001 includes a querying device 1003 with a display 1005 that captures the current view from a camera 1007 and shows it on the display 1005 with an overlay from the database 1009 and shows the location a first transmitter 1011 attached to a first asset 1013 with an indicator 1015 that shows that the first asset 1013 is the target of the inquiry as opposed to a second asset 1017 with its attached second transmitter 1019. The augmented reality shown on the querying device 1003 improves the efficiency of the user to identify the asset that is the subject of the inquiry.

In this embodiment 1001 it is contemplated that the first transmitter 1011 and the second transmitter 1019 are in constant communication with a gateway of the system 1001. If a transmitter ceases to communicate with the system via the gateway, an alert is sent to the querying device 1003 so that the user may take action such as verify that the asset is not present or repairing the transmitter.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An asset tracking and location monitoring system comprising:
   a plurality of transmitter tags, each attached to an asset of a plurality of assets, each of the transmitter tags associated in a database with its respective asset, wherein each of the transmitter tags comprises a low energy beacon transmitter and being programmed with a unique identifier;
   at least one gateway;
   at least one stationary transmitter associated with the at least one gateway;
   at least one workflow database that contains at least one workflow with assigned locations, each location with a stationary transmitter associated therewith;
   wherein the at least one workflow comprises at least one task to be performed on an asset and the at least one task is associated with one of the assigned locations wherein the one of the assigned locations indicates where the at least one task is to be performed;
   wherein the gateway is configured to receive communication from the plurality of transmitter tags; and
   wherein the system is configured to remotely determine a precise location of a transmitter tag based on communication with a plurality of the gateways.

2. The system of claim 1 wherein a computing device is configured to receive an instruction to locate a specific transmitter tag, and, in response to the instruction, the computing device transitions to a process whereby, when the computing device is within proximity of the specific transmitter tag, the computing device is configured to differentiate between multiple transmitter tags to determine relative proximity to the specific transmitter tag.

3. The system of claim 1, wherein the transmitter tags are configured to continuously communicate with the at least one gateway; and wherein the system is further configured to identify that a transmitter tag is not in communication with any gateway.

4. The system of claim 1, wherein the system is configured to create an alert when an asset leaves a scope of the workflow as determined by communication with the transmitter tag attached to the asset.

5. The system of claim 1 wherein the workflow comprises tasks which correspond to a set of tasks for preparing an automobile for sale.

6. The system of claim 1, wherein the gateway is configured to collect additional data related to the communication with the transmitter tags attached to the assets.

7. The system of claim 6, wherein the additional data comprises at least one of: a time of each communication, gateway ID, and other assets that the gateway communicated with.

8. The system of claim 7, wherein the additional data is used to determine the time an asset is in one location.

9. The system of claim 8, wherein the additional data is used to determine the time of a location change of an asset.

10. The system of claim 1, wherein the system is configured to determine a time and duration an asset is in one location.

11. A method for determining asset movement and location, the method comprising:
    associating, at a database, each asset of a plurality of assets with a plurality of transmitter tag unique identifiers, each of the transmitter tag unique identifiers being associated with one of a plurality of transmitter tags attached to each asset of the plurality of assets, each of the transmitter tags comprising a low energy beacon transmitter;
    associating, at the database, at least one stationary transmitter unique identifier with at least one stationary transmitter;
    receiving, by a gateway, communication from at least one of the plurality of transmitter tags;
    configuring, at the database, at least one workflow with assigned locations, wherein each location is associated with at least one of the at least one stationary transmitters and wherein the at least one workflow comprises at least one task to be performed on an asset and the at least one task is associated with one of the assigned locations wherein the one of the assigned locations indicates where the at least one task is to be performed; and
    determining, remotely from the transmitter tags, a precise location based on communication with a plurality of the gateways.

12. The method of claim 11 further comprising, receiving, by a computing device, an instruction from the database to locate a specific transmitter tag, wherein, in response to the instruction, the computing device is configured to differentiate signals of transmitter tags in proximity to the computing device in order to locate the specific transmitter tag.

13. The method of claim 12 further comprising continuously communicating, by the transmitter tags, with the gateway, and identifying, by the database, when a transmitter tag is not in communication with the gateway.

14. The method of claim 13 further comprising creating an alert when an asset leaves a scope of the workflow as determined by communication with the transmitter tag attached to the asset.

15. The method of claim 13 further comprising collecting additional data related to the communication between the gateway and the transmitter tags.

16. The method of claim 15, wherein the additional data comprises at least one of: a time of each communication, gateway ID, and other assets that the gateway communicated with.

17. The method of claim 16 further comprising determining the time an asset is in one location using the additional data.

18. The method of claim 17 further comprising determining the time of a location change using the additional data.

19. The method of claim 11 further comprising determining a time an asset is in one location.

20. A device for communicating movement and location, the device comprising:
 a transmitter tag comprising a low energy beacon transmitter and being programmed with a unique identifier, wherein the transmitter tag is one of a plurality of transmitter tags associated with a database configured to determine the location of the plurality of transmitter tags;
  wherein the transmitter tag is configured to communicate with at least one gateway;
  wherein the at least one gateway is further in communication with at least one stationary transmitter;
  wherein the gateway is further in communication with the database;
  wherein the database contains at least one workflow with assigned locations, each location with a stationary transmitter associated therewith;
  wherein the at least one workflow comprises at least one task to be performed on an asset and the at least one task is associated with one of the assigned locations wherein the one of the assigned locations indicates where the at least one task is to be performed;
  wherein the gateway is configured to receive communication from the plurality of transmitter tags; and
  wherein the database is configured to determine, remotely from the plurality of transmitter tags, a precise location based on communication with a plurality of the gateways.

* * * * *